United States Patent
Hamabe et al.

(10) Patent No.: US 12,296,843 B2
(45) Date of Patent: *May 13, 2025

(54) VEHICLE DISPLAY CONTROL DEVICE, VEHICLE DISPLAY CONTROL METHOD, AND VEHICLE DISPLAY CONTROL PROGRAM

(71) Applicant: TOYOTA JIDOSHA KABUSHIKI KAISHA, Toyota (JP)

(72) Inventors: Ryota Hamabe, Nisshin (JP); Keigo Hori, Toyota (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,611

(22) Filed: Apr. 3, 2024

(65) Prior Publication Data

US 2024/0246557 A1   Jul. 25, 2024

Related U.S. Application Data

(63) Continuation of application No. 17/857,410, filed on Jul. 5, 2022, now Pat. No. 11,975,735.

(30) Foreign Application Priority Data

Aug. 31, 2021 (JP) ................................ 2021-141917

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 30/143* (2013.01);
(Continued)

(58) Field of Classification Search
CPC .... B60W 50/14; B60W 30/143; B60W 30/16; B60W 2050/146; B60K 35/00;
(Continued)

(56) References Cited

U.S. PATENT DOCUMENTS 6,741,223 B2   5/2004   Kobayashi et al.
7,454,291 B2   11/2008  Kawakami et al.
(Continued)

FOREIGN PATENT DOCUMENTS

JP   2002316551 A   * 10/2002
JP   2016-197390 A    11/2016
(Continued)

OTHER PUBLICATIONS

Jul. 26, 2023 Office Action issued in U.S. Appl. No. 17/857,410.
Jan. 3, 2024 Notice of Allowance issued in U.S. Appl. No. 17/857,410.

*Primary Examiner* — Chico A Foxx
(74) *Attorney, Agent, or Firm* — Oliff PLC

(57) ABSTRACT

A vehicle display control device in a vehicle, the device includes a memory, a processor coupled to the memory, and a display device. In a case in which a predetermined travel assistance function is not in operation, the processor controls the display device such that a first display image is projected onto a display region, the first display image including information indicating a drive state of the drive source and information corresponding to a travel state of the host vehicle, and in a case in which the predetermined travel assistance function is in operation, the processor controls the display device such that a second display image is projected onto the display region, the second display image omitting (Continued)

display of the drive information and including a symbol indicating the predetermined travel assistance function and information indicating an operation state of the predetermined travel assistance function.

13 Claims, 9 Drawing Sheets

(51) Int. Cl.
  *B60K 35/28* (2024.01)
  *B60K 35/29* (2024.01)
  *B60K 35/60* (2024.01)
  *B60W 30/14* (2006.01)
  *B60W 30/16* (2020.01)

(52) U.S. Cl.
  CPC .......... *B60W 30/16* (2013.01); *B60K 35/28* (2024.01); *B60K 35/29* (2024.01); *B60K 35/60* (2024.01); *B60K 2360/179* (2024.01); *B60K 2360/1868* (2024.01); *B60K 2360/195* (2024.01); *B60K 2360/334* (2024.01); *B60K 2360/785* (2024.01); *B60W 2050/146* (2013.01)

(58) Field of Classification Search
  CPC ........ B60K 2360/195; B60K 2360/785; B60K 35/28; B60K 2360/1868; B60K 35/29; B60K 35/60; B60K 2360/179; B60K 2360/334
  See application file for complete search history.

(56) References Cited

U.S. PATENT DOCUMENTS

| | | | |
|---|---|---|---|
| 9,580,073 | B1 | 2/2017 | Nehmad et al. |
| 9,902,427 | B2 | 2/2018 | Mizutani et al. |
| 9,963,070 | B2 | 5/2018 | Ann et al. |
| 10,093,246 | B2 * | 10/2018 | Nakajima ............... G09G 5/00 |
| 10,197,414 | B2 | 2/2019 | Iguchi |
| 10,252,726 | B2 | 4/2019 | Emura et al. |
| 10,336,192 | B2 | 7/2019 | Fujita |
| 10,654,489 | B2 | 5/2020 | Tertoolen et al. |
| 10,870,435 | B2 | 12/2020 | Fujisawa et al. |
| 11,021,060 | B2 | 6/2021 | Cieler et al. |
| 11,199,701 | B2 | 12/2021 | Lee |
| 11,367,417 | B2 | 6/2022 | Horihata et al. |
| 11,367,418 | B2 | 6/2022 | Yamase |
| 11,414,080 | B2 | 8/2022 | Kato et al. |
| 11,597,403 | B2 | 3/2023 | Oh et al. |
| 12,145,444 | B2 * | 11/2024 | Nadaya ................. G09G 5/10 |
| 2005/0267684 | A1 | 12/2005 | Kawakami et al. |
| 2010/0191404 | A1 * | 7/2010 | Ishikawa ............... B60K 35/22 |
| | | | 701/31.4 |
| 2010/0253496 | A1 | 10/2010 | Nishikawa et al. |
| 2017/0235135 | A1 | 8/2017 | Ishiguro et al. |
| 2017/0275020 | A1 | 9/2017 | Charbonnier et al. |
| 2017/0328749 | A1 * | 11/2017 | Hattori ................. B60K 35/00 |
| 2018/0118223 | A1 | 5/2018 | Mori et al. |
| 2018/0373250 | A1 | 12/2018 | Nakamura et al. |
| 2020/0239015 | A1 | 7/2020 | Nishida |
| 2021/0237754 | A1 | 8/2021 | Shiba et al. |
| 2021/0389596 | A1 | 12/2021 | Fujita et al. |
| 2022/0219688 | A1 | 7/2022 | Ito et al. |
| 2022/0340166 | A1 | 10/2022 | Kume et al. |

FOREIGN PATENT DOCUMENTS

| | | | |
|---|---|---|---|
| JP | 2021-075219 A | 5/2021 | |
| JP | 2021-119071 A | 8/2021 | |
| JP | 2023-3663 A | 1/2023 | |
| WO | WO-2013035887 A2 * | 3/2013 | ......... B60K 31/0008 |
| WO | 2022209439 A1 | 10/2022 | |

* cited by examiner

VEHICLE DISPLAY CONTROL DEVICE, VEHICLE DISPLAY CONTROL METHOD, AND VEHICLE DISPLAY CONTROL PROGRAM

CROSS-REFERENCE TO RELATED APPLICATION

This application is a continuation of U.S. patent application Ser. No. 17/857,410 filed on Jul. 5, 2022, which claims priority under 35 USC 119 from Japanese Patent Application No. 2021-141917 filed on Aug. 31, 2021, the disclosure of each of the prior applications is hereby incorporated by reference herein in its entirety.

BACKGROUND

Technical Field

The present disclosure relates to a vehicle display control device, a vehicle display control method, and a vehicle display control program.

Related Art

Japanese Patent Application Laid-open No. 2016-197390 discloses a vehicle including an adaptive cruise control (ACC) function that maintains a distance between the host vehicle and a vehicle ahead while controlling the travel speed of the host vehicle, and a driving assistance function such as a lane-keeping assistance (LKA) function that keeps the host vehicle within a lane during travel.

Moreover, this vehicle is installed with a head-up display (HUD) device that enables a driver to perceive an image (virtual image) projected onto a projection region defined by a windshield.

The HUD device causes the driver to associate the activation states of the ACC and the LKA with each other, and also performs display indicating a standby state, and when activation is approved, the HUD device displays an image indicating that the respective functions are in an activated state.

Incidentally, the HUD devices installed in a vehicle have a limited area for displaying images. Therefore, it is desired that information be effectively included in an image that is displayed in a limited area of a vehicle.

SUMMARY

The present disclosure has been accomplished in consideration of the foregoing circumstances, and provides a vehicle display control device, a vehicle display control method, and a vehicle display control program capable of displaying an effective image at a limited area of a vehicle.

A vehicle display control device according to a first aspect is installed at a host vehicle configured to travel as a result of a drive source being driven, the vehicle display control device including: a memory; a processor coupled to the memory; and a display device. The processor is configured to control the display device and project an image onto a display region configured at a windshield glass. In a case in which a predetermined travel assistance function provided at the host vehicle is not in operation, the processor is configured to control the display device such that a first display image is projected onto the display region, the first display image including drive information indicating a drive state of the drive source and information corresponding to a travel state of the host vehicle, and in a case in which the predetermined travel assistance function is in operation, the processor is configured to control the display device such that a second display image is projected onto the display region, the second display image omitting display of the drive information and including a symbol indicating the predetermined travel assistance function and information indicating an operation state of the predetermined travel assistance function.

The vehicle display control device of the first aspect is provided at a host vehicle that travels, in response to a drive state of the drive source, by the drive source being driven, and the processor controls the display device and projects an image onto a display region area configured at the windshield glass.

The processor controls an image to be displayed at the display region of the windshield glass. At this time, in a case in which a predetermined travel assistance function provided in the vehicle is not in operation, the processor controls the display device so as to display a first display image including drive information (such as engine speed) indicating a drive state of the drive source and information corresponding to a travel state of the vehicle. Further, in a case in which a predetermined travel assistance function has been activated, the processor controls the display device so as to display a second display image including a symbol indicating the predetermined travel assistance function and information indicating an operation state of the predetermined travel assistance function.

The second display image omits display of drive information indicating the drive state of the drive source. The travel assistance function assists driving operation by the driver, and in a case in which the travel assistance function is in operation, the driver does not necessarily needs drive information indicating the drive state of the drive source.

By omitting display of the drive information of the drive source from the second display image displayed when the travel assistance function has been activated, an effective image can be displayed in a limited area of the vehicle.

In a vehicle display control device of a second aspect, in the first aspect, the first display image and the second display image include at least one of information indicating a shift range of the vehicle or information indicating a vehicle speed.

In the vehicle display control device of the second aspect, at least one of the information indicating the shift range or the vehicle speed is included in the second display image. This enables the driver to comprehend the travel state of the vehicle regardless of whether or not the travel assistance function is in operation.

In a vehicle display control device of a third aspect, in the first or second aspect, the predetermined travel assistance function includes a function that maintains a vehicle speed and an inter-vehicle distance relative to a preceding vehicle, and the symbol of the second display image includes a symbol indicating the inter-vehicle distance between the host vehicle and the preceding vehicle.

The vehicle display control device of the third aspect includes an ACC function that maintains a vehicle speed and a vehicle distance from a preceding vehicle as a predetermined travel assistance function. In a case in which the ACC function is in operation, a symbol indicating an inter-vehicle distance between the host vehicle and the preceding vehicle is displayed in the second display image. This enables the driver to accurately comprehend that the ACC is in operation.

In a vehicle display control device of a fourth aspect, in any one of the first aspect to the third aspect, the predetermined travel assistance function includes a function that keeps the host vehicle in a travel lane, and the symbol of the second display image includes a symbol indicating the travel lane in which the host vehicle is traveling.

The vehicle display control device of the fourth aspect includes a lane-keep function, which is a function that causes the host vehicle to stay in a travel lane, as a predetermined travel assistance function. In a case in which the lane-keep function is operated, the second display image includes a symbol indicating the lane in which the host vehicle is traveling. This enables the driver to accurately comprehend that the lane-keep function is operating.

In a vehicle display control device of a fifth aspect, in any one of the first to fourth aspects, the display region is configured at a lower-side portion of the windshield glass, and the first display image is projected onto a lower-side portion inside the display region.

In the vehicle display control device of the fifth aspect, the first display image is projected onto a lower-side portion within the display region, which is configured at a lower-side portion of the windshield glass. This enables a situation in which a large-sized first display image is projected onto the windshield glass in a state in which the travel assistance function is not operating, to be avoided.

A method of vehicle display control of a sixth aspect, in a configuration in which an image is projected by a display device onto a display region configured at a windshield glass of a vehicle that is configured to travel as a result of a drive source being driven, the vehicle being provided with a memory, a processor coupled to the memory, and the display device. The method includes: in a case in which a predetermined travel assistance function provided at the vehicle is not in operation, the processor controls the display device such that a first display image is projected onto the display region, the first display image including drive information indicating a drive state of the drive source and information corresponding to a travel state of the vehicle. In a case in which the predetermined travel assistance function is in operation, the processor controls the display device such that a second display image is projected onto the display region, the second display image omitting display of the drive information and including a symbol indicating the predetermined travel assistance function and information indicating an operation state of the predetermined travel assistance function.

In the vehicle display control method of the sixth aspect, similarly to the first aspect, by omitting display of the drive information of the drive source from the second display image displayed when the travel assistance function has been activated, an effective image can be displayed in a limited area of the vehicle.

A non-transitory storage medium of a seventh aspect stores a vehicle display control program that is executable by a computer to perform processing, the computer is provided at a vehicle configured to travel as a result of a drive source being driven, and an image is projected onto a display region configured at a windshield glass of the vehicle, the processing of the program including: in a case in which a predetermined travel assistance function provided at the vehicle is not in operation, projecting a first display image onto the display region, the first display image including drive information indicating a drive state of the drive source and information corresponding to a travel state of the vehicle; and in a case in which the predetermined travel assistance function is in operation, projecting a second display image onto the display region, the second display image omitting display of the drive information and including a symbol indicating the predetermined travel assistance function and information indicating an operation state of the predetermined travel assistance function.

Similarly to the first aspect, in the non-transitory storage medium storing the vehicle display control program of the seventh aspect, by omitting display of the drive information of the drive source from the second display image displayed when the travel assistance function has been activated, an effective image can be displayed in a limited area of the vehicle.

According to the respective aspects of the present disclosure, since the drive information of the drive source is not displayed in the second display image displayed during operation of the travel assistance function, there is the advantageous effect of enabling an effective image to be displayed at a limited area of the vehicle.

DETAILED DESCRIPTION

In the following, an embodiment of the present invention is explained with reference to the drawings.

Figure 1:
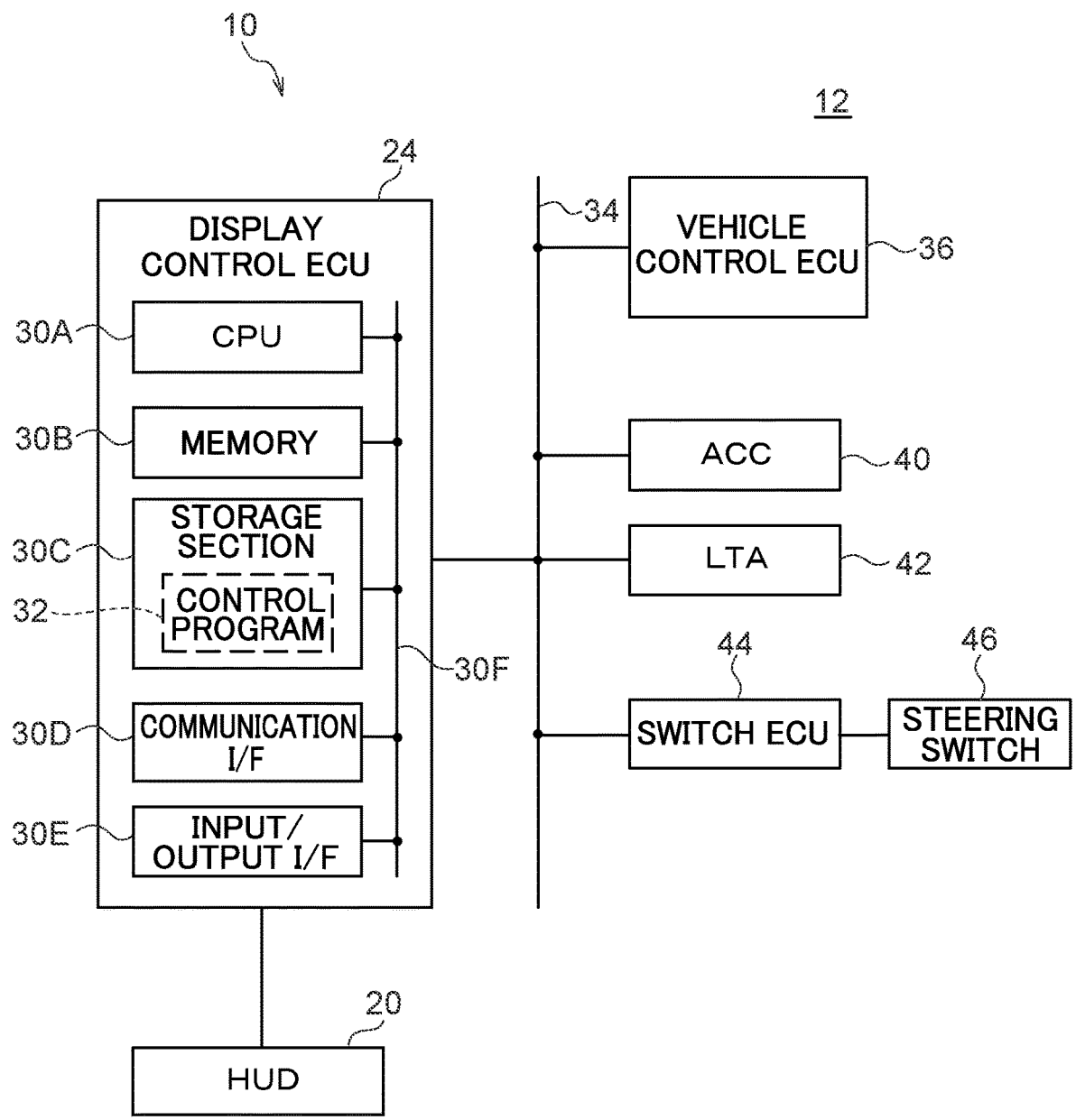
FIG. 1 is a block diagram illustrating a schematic configuration of main components of a display control device according to the present exemplary embodiment.
Figure 2:
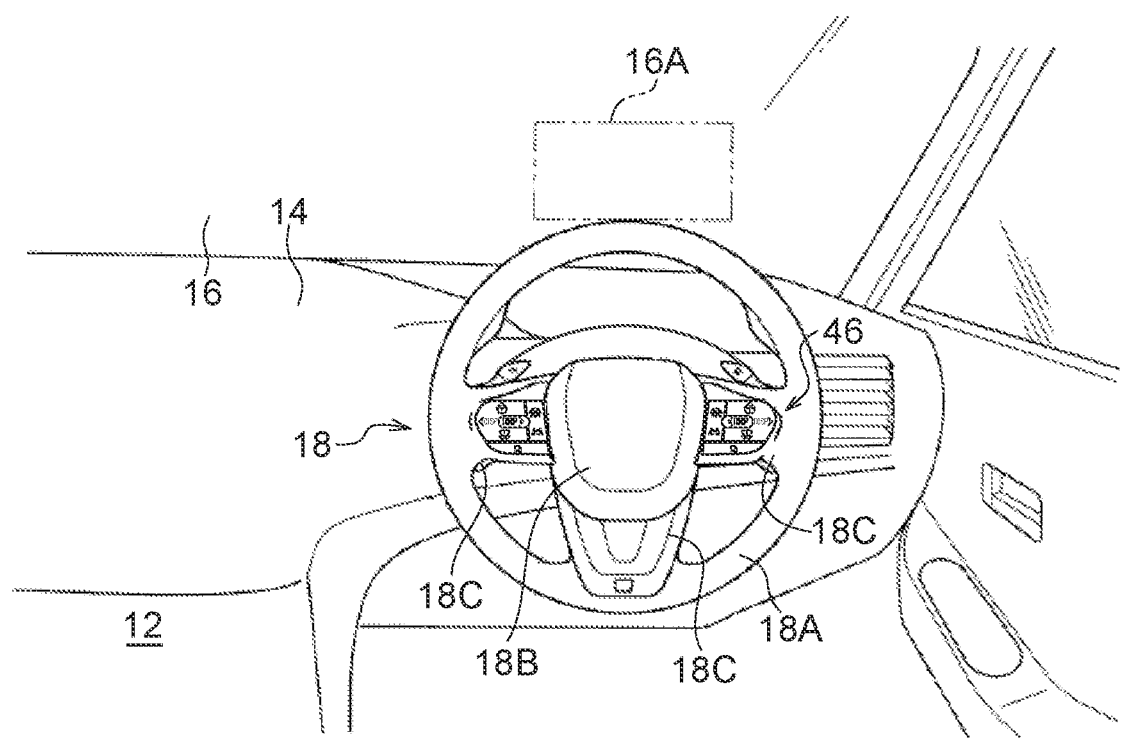
FIG. 2 is a front view illustrating main parts of a vehicle.

A display control device 10, which is a vehicle display control device according to the present exemplary embodiment, is provided at a vehicle 12, and various types of information relating to the vehicle 12 are displayed and an occupant (driver) is informed of the various types of information. FIG. 1 illustrates a block diagram of a schematic configuration of main components of the display control device 10, and FIG. 2 illustrates a front view of main parts inside the vehicle cabin as seen from the perspective of the occupant (driver).

The vehicle 12 according to the present exemplary embodiment is provided with an engine (an internal combustion engine such as a gasoline engine) that is a drive source for travel, and the vehicle 12 travels by means of the driving of the engine. As illustrated in FIG. 2, an instrument panel 14 is disposed at the vehicle 12 at a front side, in a vehicle front-rear direction, relative to a seat (driving seat) at which an occupant is seated inside the vehicle cabin. A windshield glass 16 is disposed at a vehicle front-side end of the instrument panel 14, and the windshield glass 16 extends in a vertical direction and a vehicle width direction and partitions the interior of the vehicle cabin from the exterior of the vehicle cabin.

A steering shaft (not illustrated) having an axial direction in the vehicle front-rear direction is disposed at a vehicle front side of the vehicle cabin, and the steering shaft is supported rotatably by the vehicle body. Further, a steering wheel 18 is disposed at a vehicle front side of the driving seat. The steering wheel 18 is integrated by connecting an annular rim part 18A and a hub part 18B disposed at a central portion of the rim part 18A via a spoke part 18C.

The steering wheel 18 is supported rotatably at the vehicle body, with the hub part 18B being fixed to a vehicle rearward end of the steering shaft. The vehicle 12 is steered by rotating the steering shaft by rotating the steering wheel 18 (rim part 18A). Further, a steering switch 46, which is described below, is disposed at the spoke part 18C of the steering wheel 18, and the steering switch 46 is operable by an occupant. FIG. 2 illustrates the steering wheel 18 in a state of straight-forward vehicle progress.

Figure 3:
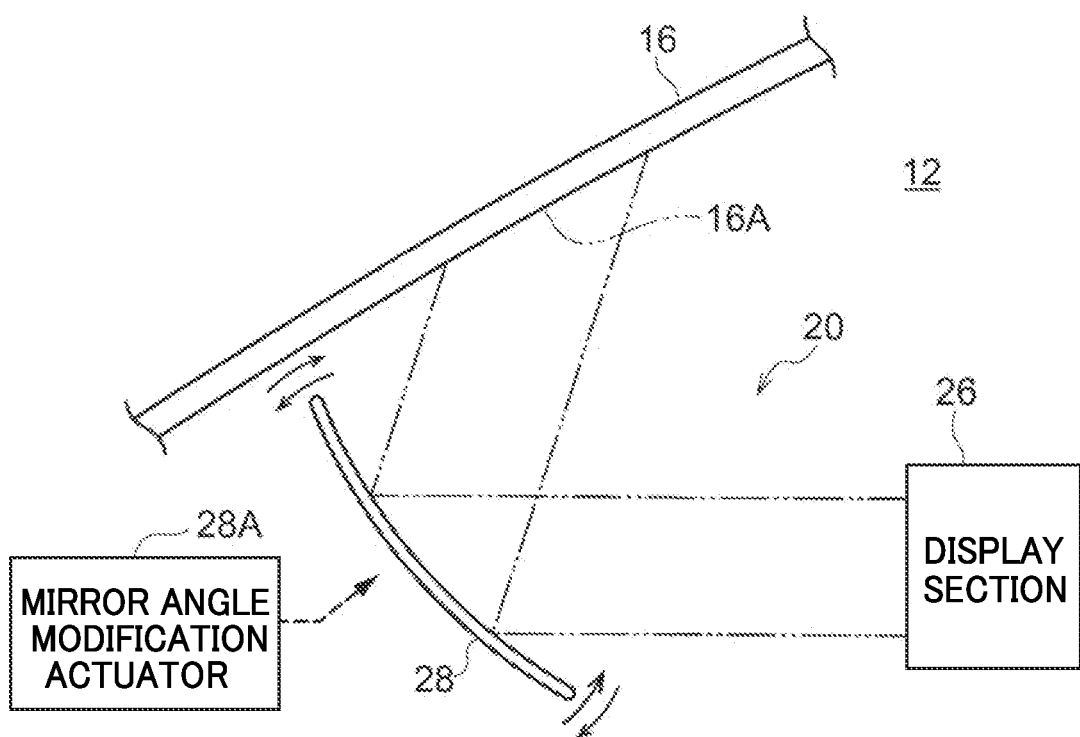
FIG. 3 is a schematic configuration diagram illustrating main components of a head-up display (HUD)

As illustrated in FIG. 1, the display control device 10 includes a head-up display (HUD) 20 as a display device, and a display control electronic control unit (ECU) 24 configured to control image display of the HUD 20. FIG. 3 shows a schematic configuration diagram of the HUD 20.

As illustrated in FIG. 3, the HUD 20 includes a display section 26 that emits projection light for a display image, a mirror 28 configured by a concave mirror and configured to reflect and project projection light, emitted from the display section 26, onto the windshield glass 16, and a mirror angle modification actuator 28A that modifies the reflection angle of the mirror 28 with respect to the projection light.

As illustrated in FIG. 1 and FIG. 3, a display region 16A, onto which a display image is projected, is established at the windshield glass 16, and the display region 16A is located at the vehicle front side of the driver's seat, and is configured as a lower-side portion of the windshield glass 16 in the vertical direction. As a result, the display region 16A is positioned such that a lower part thereof in the vertical direction overlaps with a hood (not illustrated) or the like at a front portion of the vehicle 12 when viewed from the perspective of an occupant seated in the driving seat.

The windshield glass 16 is treated with half-mirroring or the like at a cabin inner surface corresponding to the display region 16A. The windshield glass 16 enables an occupant to view a display image projected onto the display region 16A, and also enables the occupant to view a scene (a sight), a person (a pedestrian), or the like, ahead of the vehicle from inside the vehicle cabin.

As illustrated in FIG. 1, the display control ECU 24 includes a central processing unit (CPU) 30A and memory 30B such as read only memory (ROM) and random access memory (RAM). The display control ECU 24 includes a storage section 30C including non-volatile storage such as a hard disk drive (HDD) or a solid state drive (SSD), a communication interface (I/F) 30D, and an input/output interface (I/F) 30E. In the display control ECU 24, the CPU 30A, memory 30B, storage section 30C, communication I/F 30D, and input/output I/F 30E are communicably connected with each other via a bus 30F.

The display control ECU 24 stores a vehicle display control program 32 in the storage section 30C. The display control ECU 24 implements functionality as a control section that controls a display image of the HUD 20 by the CPU 30A reading the control program 32 from the storage section 30C and executing the control program 32 while opening the control program 32 in the memory (RAM) 30B.

The display control ECU 24 is connected to a system bus 34 provided in the vehicle 12. Moreover, the vehicle 12 is installed with a vehicle control ECU 36 that performs vehicle control including travel control, and the vehicle control ECU 36 is connected to the system bus 34. Various control ECUs (not illustrated) are installed in the vehicle 12, such as an engine ECU that performs engine control, a steering control ECU that performs steering control, a braking control ECU that performs braking control, and a shift control ECU that performs transmission control. The vehicle control ECU 36 performs vehicle control in cooperation with the various control ECUs.

Various onboard devices (none of which is illustrated) such as an air conditioner, an audio system, a car navigation system, and a voice input system are installed in the vehicle 12, and these onboard devices are connected to the system bus 34. The vehicle control ECU 36 is thereby connected to the onboard devices via the system bus 34, enabling operation management and control of each of the onboard devices.

Further, devices (travel assistance devices) for travel assistance, such as an adaptive cruise control (ACC) device 40 and a lane tracing assistance (LTA) device 42, are installed in the vehicle 12. The ACC device 40 and the LTA device 42 are each connected to the system bus 34.

In the vehicle 12, the ACC device 40 implements a travel assistance function (ACC function) that maintains a vehicle speed and an inter-vehicle distance from a preceding vehicle, and the LTA device 42 implements a function (stay-in-lane function, LTA function) that causes the host vehicle (vehicle 12) to stay in a travel lane. In the vehicle 12, the vehicle control ECU 36, the ACC device 40, and the LTA device 42 may operate in concert as a travel assistance device and implement travel assistance functionality that supports driving operation by an occupant.

The ACC device 40 controls the vehicle 12 so as to travel at a set vehicle speed in cooperation with the vehicle control ECU 36 by having a vehicle speed (travel speed) set by an occupant. Moreover, using a camera that images ahead of the vehicle, a millimeter-wave radar that transmits scanning waves (millimeter waves) to a predetermined range ahead of the vehicle and receives reflected waves, or the like, the ACC device 40 detects a preceding vehicle traveling ahead of the vehicle 12, and also detects an inter-vehicle distance between the preceding vehicle and the vehicle 12. The ACC device 40 performs vehicle speed control and the like in cooperation with the vehicle control ECU 36 so as not to allow the detected inter-vehicle distance to become equal to or less than a preset inter-vehicle distance.

Using a camera (image capture means) that images ahead of the vehicle, the LTA device 42 detects lanes (white lines to the left and right) marked on the road surface on which the vehicle 12 is traveling, and performs steering control and the like in cooperation with the vehicle control ECU 36 so as to cause the vehicle 12 to travel between the white lines to the left and right.

Moreover, the vehicle 12 is provided with a switch ECU 44 as selection means and setting means, and the switch ECU 44 is connected to the system bus 34. Plural switches are connected to the switch ECU 44. In the present exemplary embodiment, the steering switch 46 is used as the plural switches.

As illustrated in FIG. 2, the steering wheel 18 is provided with a steering switch 46 at a spoke part 18C. Although the steering wheel 18 is provided with steering switches at the spoke part 18C at the right side of the hub part 18B in the vehicle width direction and at the spoke part 18C at the left side of the hub part 18B in the vehicle width direction, in the present exemplary embodiment, the steering switch 46 at the right side of the hub part 18B is explained. Main components of the steering switch 46 are illustrated in front view in FIG. 4. The steering switch 46 can be configured to be selectable from either the right side in the vehicle width direction, or the left side in the vehicle width direction, of the hub part 18B.

Figure 4:
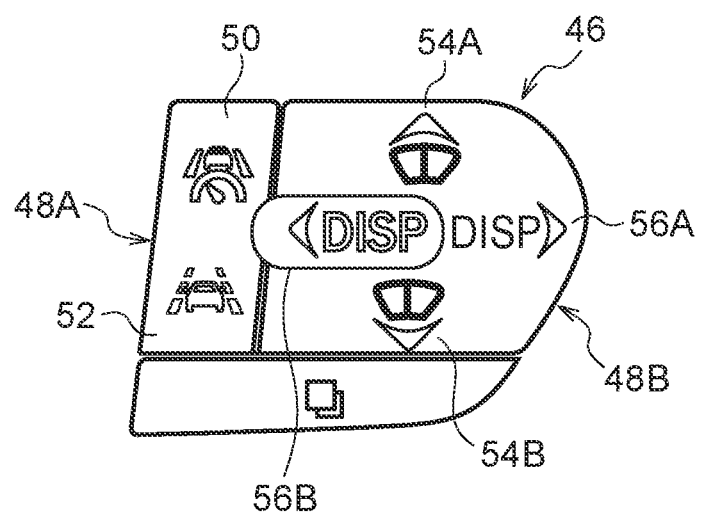
FIG. 4 is a front view illustrating an example of a steering switch.

As illustrated in FIG. 4, the steering switch 46 includes a tact switch 48A at the side of the hub part 18B (the left side of the drawing in FIG. 4) and a tact switch 48B at the side of the rim part 18A side (the right side of the drawing in FIG. 4), and the tact switches 48A, 48B are configured as contact detection-type switches, for example.

One side (the upper side in the drawing in FIG. 4) of the tact switch 48A is configured as the ACC switch 50, while the other side (the lower side in the drawing in FIG. 4) is configured as the LTA switch 52. The ACC device 40 is switched on/off by operating the ACC switch 50. The LTA device 42 is switched on/off by operating the LTA switch 52.

The tact switch 48B is configured with a vehicle speed increase switch 54A, a vehicle speed decrease switch 54B, an inter-vehicle distance increase switch 56A, and an inter-vehicle distance decrease switch 56B. The vehicle speed set in the ACC device 40 is increased stepwise by operating the increase switch 54A, and is decreased stepwise by operating the decrease switch 54B. Moreover, regarding the inter-vehicle distance, the set inter-vehicle distance is gradually lengthened (the inter-vehicle gap is widened) by operating the increase switch 56A, and the set inter-vehicle distance is gradually shortened (the inter-vehicle gap is narrowed) by operating the decrease switch 56B.

The display control ECU 24 acquires information corresponding to a travel state or an operation state of the vehicle 12 via the system bus 34, and enables the HUD 20 to display an image corresponding to the acquired information at the display region 16A of the windshield glass 16.

The display control ECU 24 acquires operation information from the ACC device 40 and the LTA device 42, and switches the image displayed by the HUD 20 at the display region 16A of the windshield glass 16 in accordance with the acquired operation information. At this time, the display control ECU 24 switches the image displayed at the display region 16A between a state in which neither the ACC device 40 nor the LTA device 42 is in operation (hereafter, referred to as a steady state), and a state in which at least one of the ACC device 40 or the LTA device 42 is in operation (hereafter, referred to as a travel assistance state).

In the following explanation, in order to simplify explanation, performing image display (image projection) at the display region 16A of the windshield glass 16 is explained as image display at the HUD 20. In the following explanation, operation of the ACC device 40 is explained as operation of the ACC function, and operation of the LTA device 42 as operation of the LTA function.

Figure 5A:
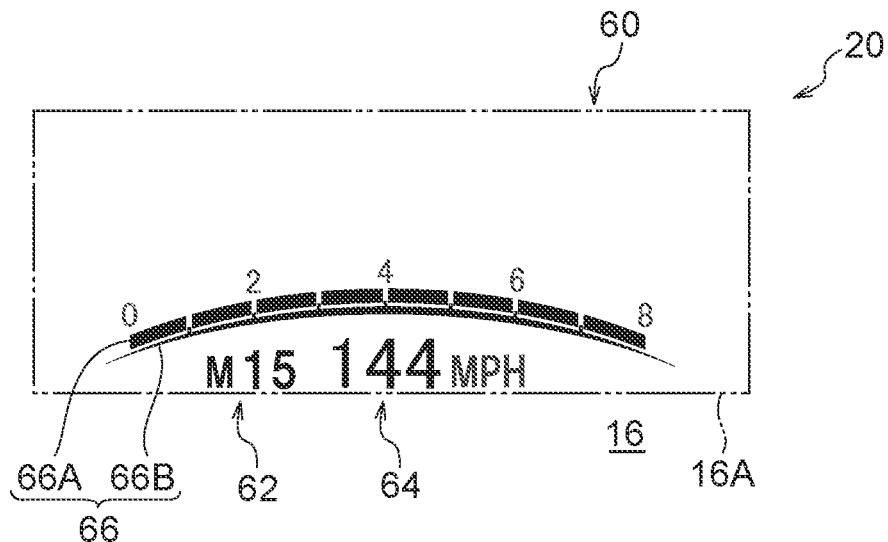
FIG. 5A is a schematic diagram illustrating an example of a display image in a steady state.
Figure 5B:
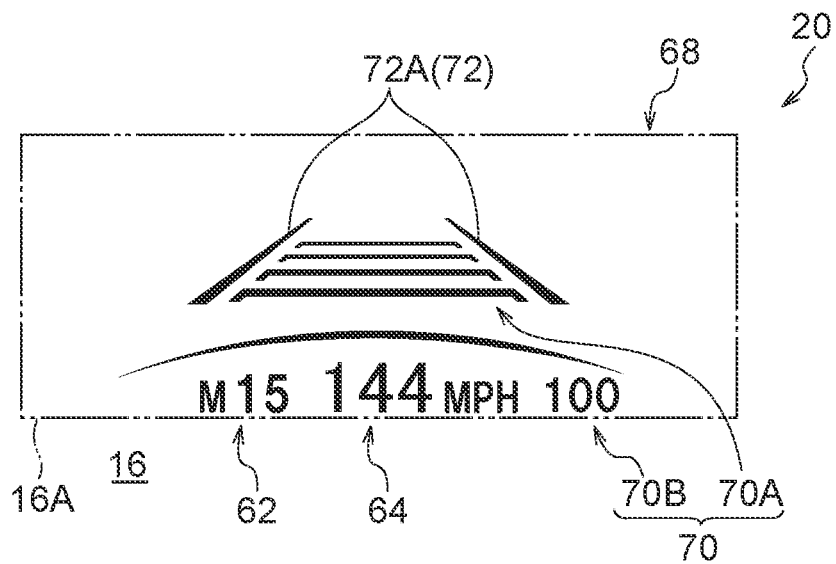
FIG. 5B is a schematic diagram illustrating an example of a display image in a travel assistance state.
Figure 6A:
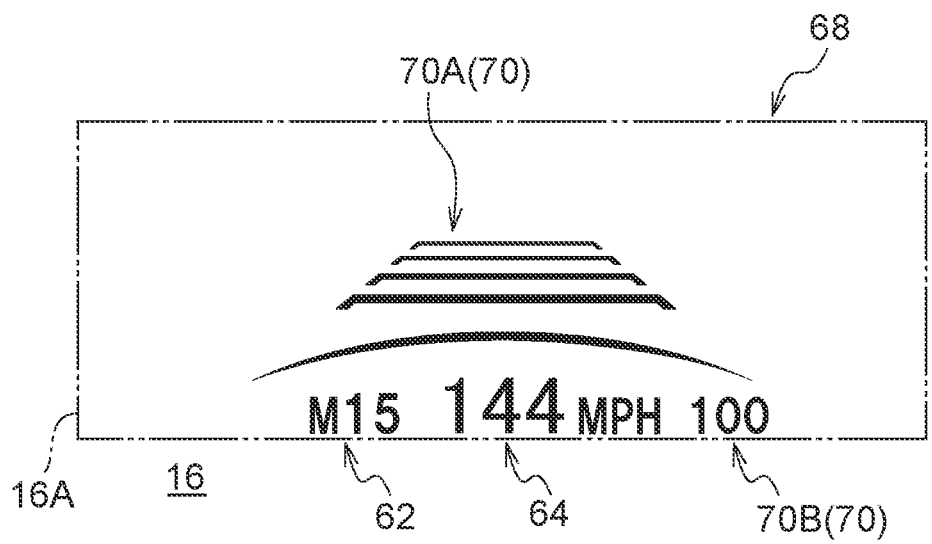
FIG. 6A is a schematic diagram illustrating an example of a display image at which symbols corresponding to operation of an adaptive cruise control (ACC) function are displayed.
Figure 6B:
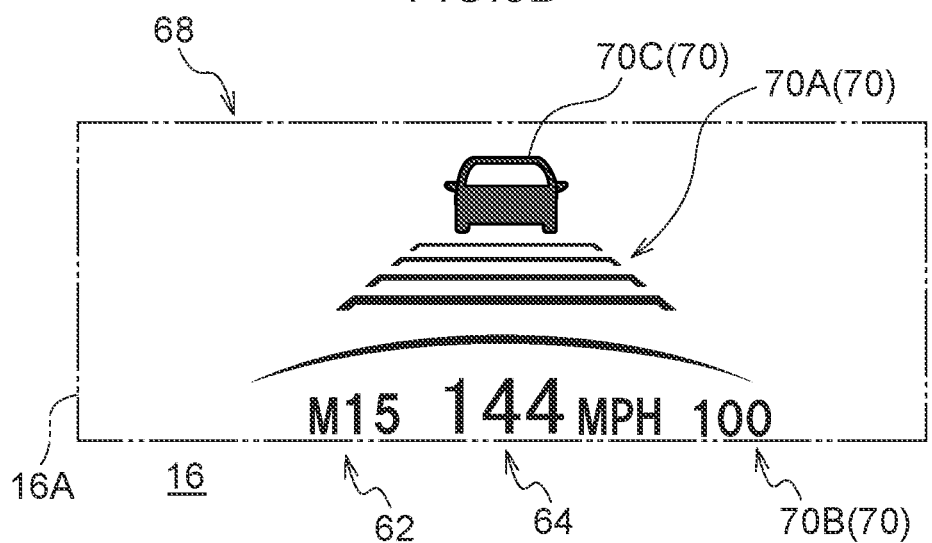
FIG. 6B is a schematic diagram illustrating another example of a display image at which symbols corresponding to operation of an ACC function are displayed.
Figure 7:
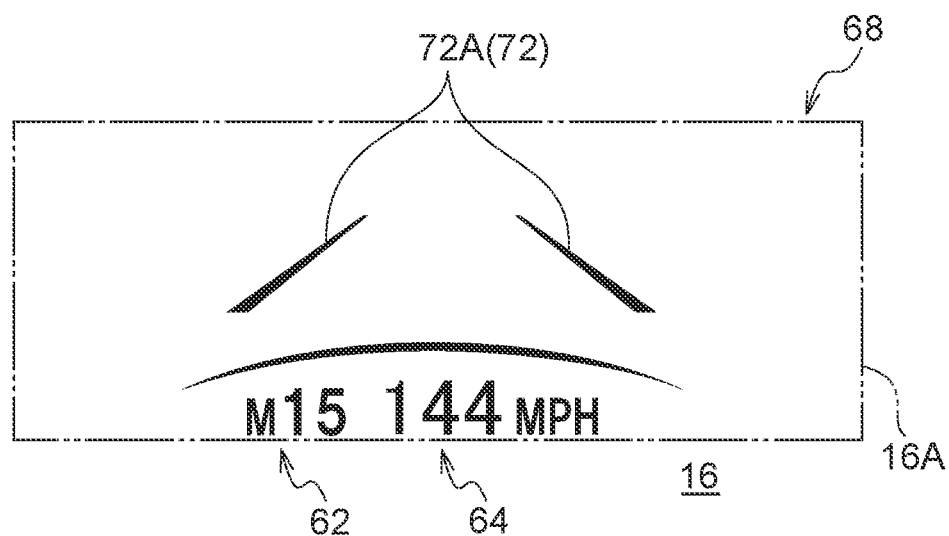
FIG. 7 is a schematic diagram illustrating an example of a display image at which symbols corresponding to operation of a lane tracing assistance (LTA) function are displayed.

FIG. 5A is a schematic diagram illustrating a display image of the HUD 20 in a steady state, and FIG. 5B is a schematic diagram illustrating a display image of the HUD 20 in a travel assistance state. FIG. 6A and FIG. 6B are schematic diagrams illustrating symbols (symbols included in a display image) displayed at the HUD 20 when the ACC function is activated, and FIG. 7 is a schematic diagram illustrating symbols (symbols included in a display image) displayed at the HUD 20 when the LTA function is activated.

As illustrated in FIG. 5A, a display image 60, which is a first display image, includes a position element 62 as an image indicating a shift position of the transmission of the vehicle 12 acquired from the vehicle control ECU 36 or the like via the system bus 34. Moreover, the display image 60 includes a vehicle speed element 64 indicating the travel speed of the vehicle 12 is displayed. Moreover, the display image 60 includes a tachometer element 66 or the like that displays the number of revolutions (engine speed) of the drive shaft of the engine indicating an operation state of the drive source of the vehicle 12.

The position element 62 includes the alphabetical character "M" and a two-digit numeral (Arabic numerals), and the two-digit numeral is changed in accordance with the shift position of the transmission. The tachometer element 66 includes a scale bar 66A and an index bar 66B, each of which is formed in an arc shape. One side of the scale bar 66A in the circumferential direction is set as a low rotational speed side, and the other side in the circumferential direction is set as a high rotation side, and one end side of the index bar 66B in the circumferential direction is set at the low rotation-side end of the scale bar 66A, and the other end side in the circumferential direction is changed along the scale bar 66A in accordance with the engine speed.

The vehicle speed element 64 is disposed at a lower portion in the vertical direction, and at an intermediate portion (central portion) in the vehicle width direction, on the display image 60. Moreover, the position element 62 is disposed in alignment with the vehicle speed element 64, on the left side (or on the right side) of the vehicle width direction of the vehicle speed element 64. The tachometer element 66 is disposed so as to be upwardly convex at an upper side of the vehicle speed element 64. As a result, in the display image 60, the position element 62, the vehicle speed element 64, and the tachometer element 66 are arranged so as to be grouped together at a lower portion in the vertical direction, and the upper-side portion in the vertical direction is configured as a non-image region (a region in which an image is not disposed).

As illustrated in FIG. 5B, the tachometer element 66 is excluded from the display image 68 serving as the second display image, while the position element 62 and the vehicle speed element 64 are disposed in the display image 68. The display image 68 also displays an ACC symbol 70, which indicates that the ACC function is in operation, and an LTA symbol 72, which indicates that the LTA function is in operation. The ACC symbol 70 and the LTA symbol 72 are disposed at the upper-side portion in the vertical direction (a portion above the vehicle speed part 64) of the display image 68.

As illustrated in FIG. 6A, the ACC symbol 70 includes plural inter-vehicle bars 70A and a set vehicle speed element 70B. The number of inter-vehicle bars 70A depends on the inter-vehicle distance set by the ACC function (ACC device 40), and an inter-vehicle bar 70A at the upper side is shorter than one at the lower side of the display image 60, whereby the inter-vehicle bars 70A are arranged in a substantially trapezoidal shape as a whole. Moreover, the set vehicle speed element 70B is disposed at an opposite side of the vehicle speed element 64 from the position element 62.

As illustrated in FIG. 6B, the ACC symbol 70 may include a vehicle mark 70C schematically illustrating a preceding vehicle. The vehicle mark 70C is displayed above the inter-vehicle bars 70A upon detection of a preceding vehicle that is subject to the inter-vehicle distance relative to the vehicle 12.

As illustrated in FIG. 7, white line markings 72A are used in pairs in the LTA symbol 72, and the spacing between the pair of white line markings 72A is narrower at an upper side than at a lower side in the vertical direction. As a result, as illustrated in FIG. 5B, the inter-vehicle bars 70A of the ACC symbol 70 are disposed between the pair of white line markings 72A of the LTA symbol 72.

Figure 8:
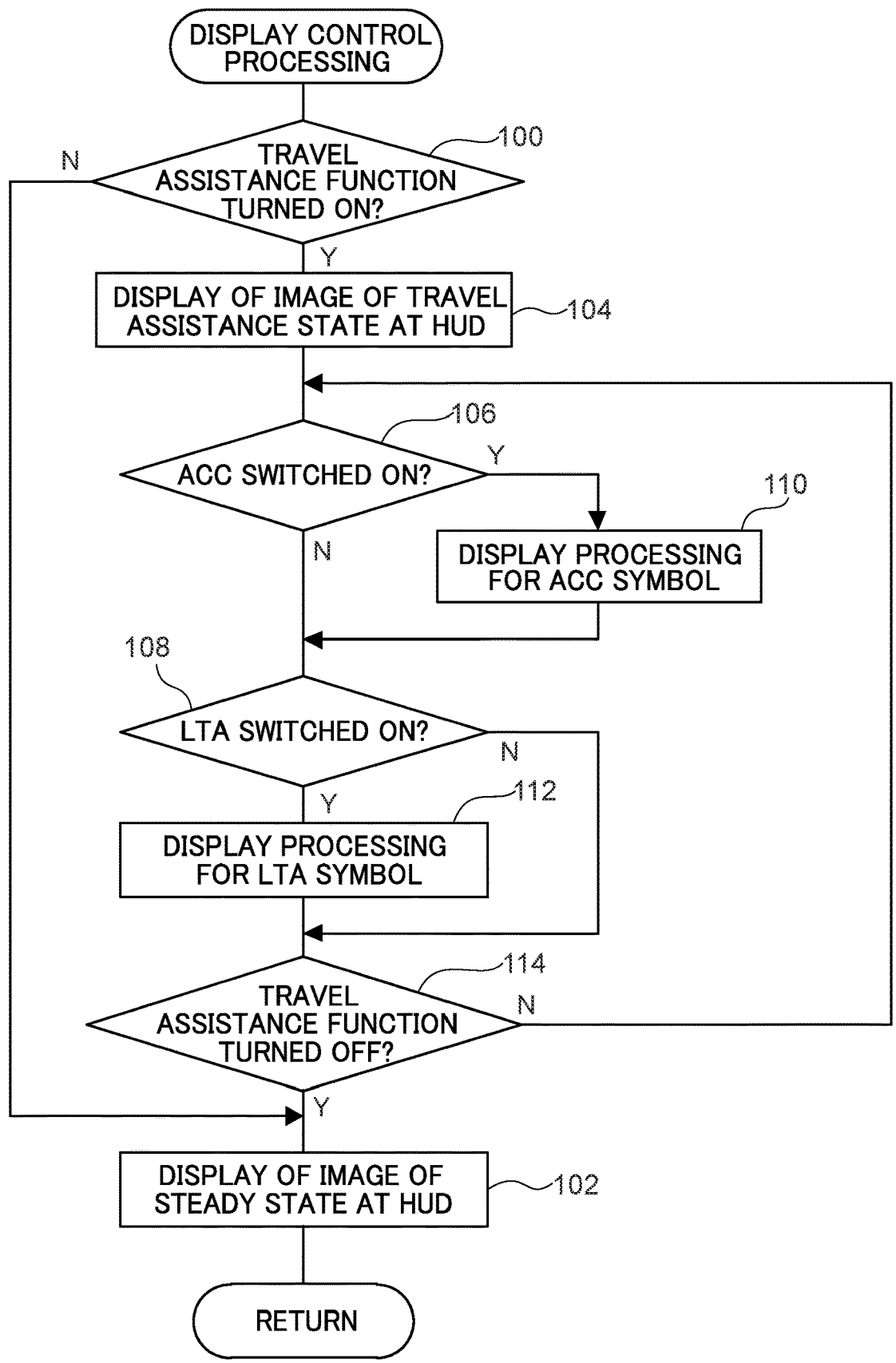
FIG. 8 is a flowchart illustrating an overview of display control processing.
Figure 9A:
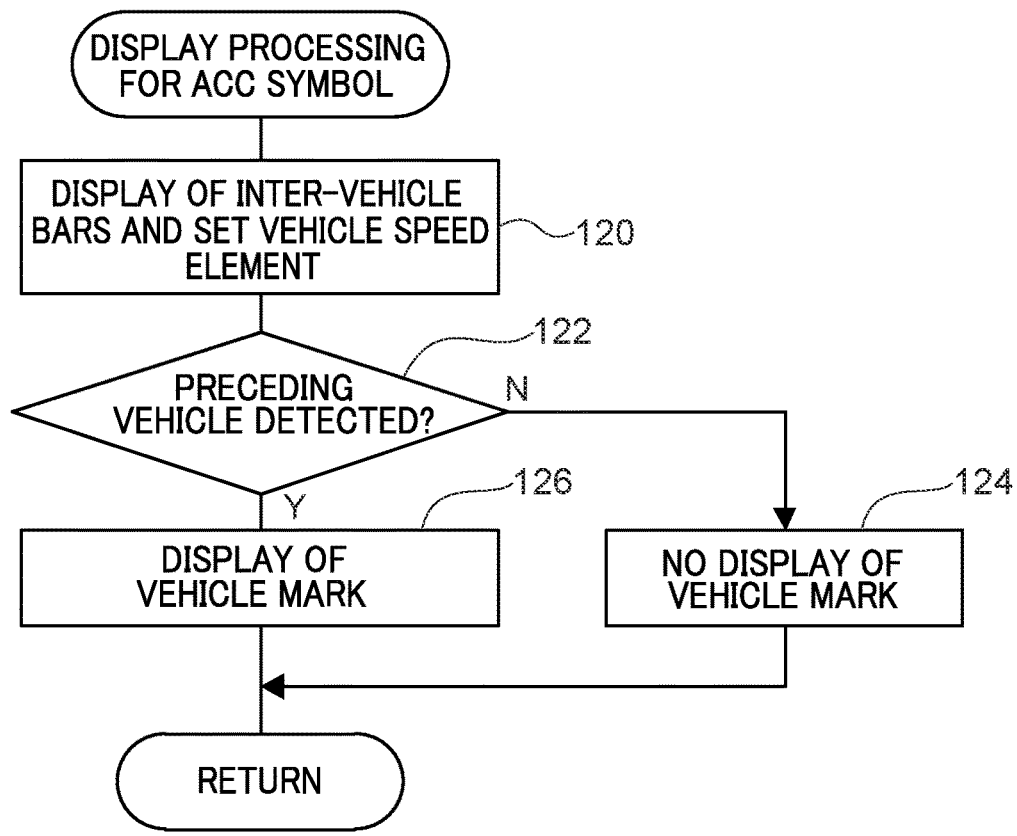
FIG. 9A is a flowchart illustrating an example of display processing for an ACC symbol.
Figure 9B:
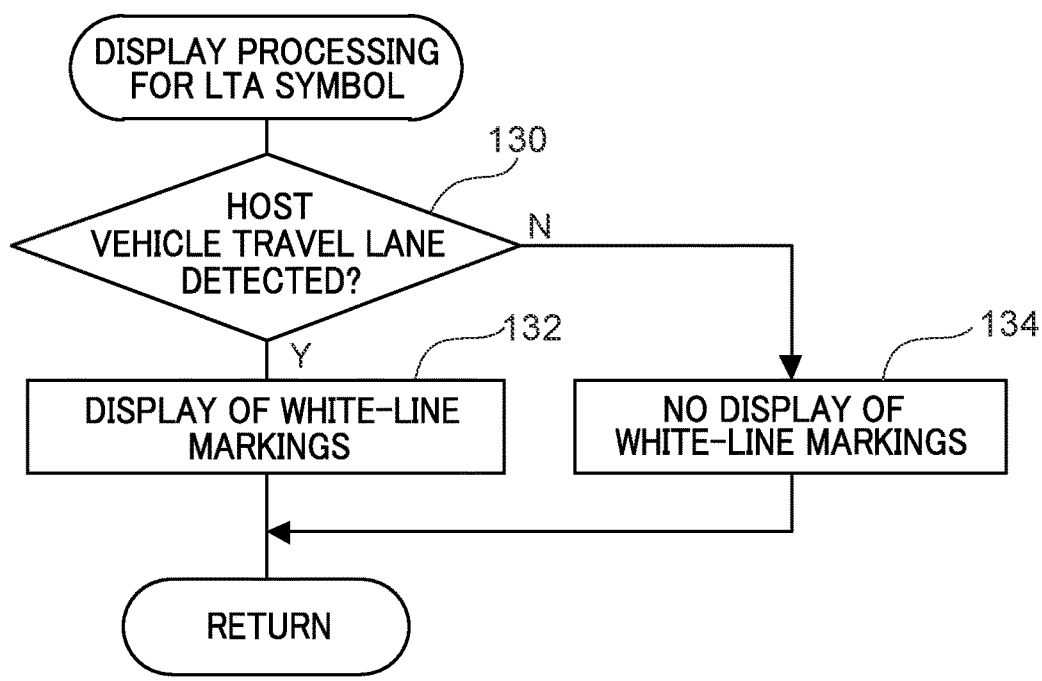
FIG. 9B is a flowchart illustrating an example of display processing for an LTA symbol.

Next, explanation is given regarding the display control of the HUD 20 implemented by the display control ECU 24. FIG. 8 is a flowchart illustrating an overview of display control processing, FIG. 9A is a flowchart illustrating display processing for the ACC symbol 70, and FIG. 9B is a flowchart illustrating display processing for the LTA symbol 72.

The vehicle 12 is provided with an ACC device 40, and in the ACC device 40, the vehicle speed and the inter-vehicle distance can be set by operating the tact switch 48B of the steering switch 46. The increase switch 54A and the decrease switch 54B are used to set the vehicle speed, and the increase switch 56A and the decrease switch 56B are used to set the inter-vehicle distance. Moreover, in the vehicle 12, the tact switch 48A of the steering switch 46 is used to turn both the ACC device 40 and the LTA device 42 on and off.

Further, the display control device 10 is operated by turning on an ignition switch or the like of the vehicle 12, whereby the display control ECU 24 initiates the display control processing, and ends the display control processing when operation is stopped by turning off the ignition switch, for example.

As illustrated in FIG. 8, the display control ECU 24 checks whether or not a travel assistance function has been switched on in the first step 100, and in cases in which neither the ACC switch 50 nor the LTA switch 52 of the tact switch 48A has been turned on, a negative determination is made at step 100, and processing transitions to step 102.

At step 102, the display control ECU 24 causes the display image 60 applied to the steady state to be displayed at the HUD 20. As a result, the position element 62, the vehicle speed element 64, and the tachometer element 66 are displayed at the HUD 20, and the display content of each of the position element 62, the vehicle speed element 64, and the tachometer element 66 is changed in accordance with the travel state of the vehicle 12.

Moreover, when at least one of the ACC switch 50 or the LTA switch 52 is turned on, the display control ECU 24 makes an affirmative determination at step 100, and transitions to step 104. At step 104, the display control ECU 24 causes the display image 68 applied to the travel assistance state to be displayed at the HUD 20. As a result, the tachometer element 66 is not displayed at the HUD 20 in the travel assistance state.

Then, the display control ECU 24 checks at step 106 whether or not the ACC switch 50 has been turned on, and checks at step 108 whether or not the LTA switch 52 has been turned on.

When the ACC switch 50 is turned on, the display control ECU 24 makes an affirmative determination at step 106, transitions to step 110, and performs display processing for the ACC symbol 70. In a case in which the LTA switch 52 is turned on, the display control ECU 24 makes a negative determination at step 106, makes an affirmative determination at step 108, and transitions to step 112. At step 112, the display control ECU 24 performs display processing for the LTA symbol 72.

Then, at step 114, the display control ECU 24 checks whether or not the travel assistance function has been switched off, and in cases in which neither the ACC switch 50 nor the LTA switch 52 has been turned off, a negative determination is made at step 114, and processing transitions to step 106 and continues. When both the ACC switch 50 and the LTA switch 52 have been turned off, the display control ECU 24 makes an affirmative determination at step 114, transitions to step 102, and causes the display image 60 applied to a steady state to be displayed at the HUD 20.

The display processing for the ACC symbol 70 illustrated in FIG. 9A is executed by transitioning to step 110 of FIG. 8, and the display control ECU 24 displays the inter-vehicle bar 70A and the set vehicle speed element 70B at the first step 120. At this time, the display control ECU 24 displays the number of inter-vehicle bars 70A corresponding to the preset inter-vehicle distance, and displays the preset vehicle speed at the set vehicle speed element 70B.

Then, the display control ECU 24 transitions to step 122 and checks whether or not a preceding vehicle has been detected. In a case in which a preceding vehicle has not been detected, the display control ECU 24 makes a negative determination at step 122, transitions to step 124, and does not display the vehicle mark 70C. As a result, the inter-vehicle bars 70A and the set vehicle speed element 70B are displayed at the HUD 20, and the ACC symbol 70 is displayed with the vehicle mark 70C not shown (see FIG. 6A).

In contrast, in a case in which a preceding vehicle has been detected, the display control ECU 24 makes an affirmative determination at step 122, transitions to step 126, and displays the vehicle mark 70C. As a result, the ACC symbol 70 displaying the vehicle mark 70C together with the inter-vehicle bars 70A and the set vehicle speed element 70B is displayed at the HUD 20 (see FIG. 6B).

The display processing of the LTA symbol 72 illustrated in FIG. 9B is executed by transitioning to step 112 of FIG. 8, and the display control ECU 24 checks at the first step 130 whether or not a lane in which the host vehicle is traveling has been detected. In a case in which left and right white lines or the like on the road surface have been detected, the display control ECU 24 makes an affirmative determination at step 130, and transitions to step 132.

When transitioning to step 132, the display control ECU 24 displays a pair of white line markings 72A at the display image 68, and causes the LTA symbol 70 to be displayed at the HUD 20 (see FIG. 7).

In contrast, in a case in which a lane in which the host vehicle is traveling has not been detected, the display control ECU 24 makes a negative determination at step 130, transitions to step 134, and operates such that the white line markings 72A are not displayed. As a result, the white line markings 72A are not displayed in the display image 68 of the HUD 20, and thus the LTA symbol 70 is not displayed.

In this way, in the steady state in which the travel assistance function is not switched on in the display control device 10, the display image 60 including the tachometer element 66 in addition to the position element 62 and the vehicle speed element 64 is displayed at the HUD 20. This enables the occupant to easily recognize the operation state of the engine, in addition to the operation state (travel state) of the vehicle 12.

Moreover, in the display image 60, the position element 62, the vehicle speed element 64, and the tachometer element 66 are displayed at a lower portion of the display region 16A of the windshield glass 16. Accordingly, even if the display region 16A is provided in the windshield glass 16, the view ahead of the vehicle as viewed by an occupant who performs the driving operation of the vehicle 12, which is not subject to travel assistance, is not obstructed.

Moreover, the display control device 10 displays the display image 68 at the HUD 20 by turning on the travel function. The tachometer element 66 is not shown in the display image 68. Generally, the travel assistance function is a function that assists driving operation by an occupant, and an occupant who is being assisted with the driving operation does not necessarily need to be aware of the engine speed, which represents the operation state of the engine. This makes it possible to suppress over-complication of the display image 68 by not displaying the tachometer element 66, enabling the display region 16A to be effectively used and image display performed. This enables the display region 16A, which is limited in size, to be effectively used and information displayed.

Moreover, in the display control device 10, by switching between the steady state and the travel assistance state, the display image 60 and the display image 68 are switched between. This enables the occupant to appropriately recognize from the display of the HUD 20 whether or not the travel assistance function is operating.

Moreover, in the display control device 10, the position element 62 and the vehicle speed element 64 are included in each of the display image 60 and the display image 68. This enables the occupant to understand the travel state of the vehicle 12 regardless of whether or not the travel assistance function is operating. Although the position element 62 and the vehicle speed element 64 are included in each of the display images 68 in the display control device 10, it is sufficient for the display image 68 to include at least one of the position element 62 or the vehicle speed element 64.

Moreover, since the display control device 10 displays a number of inter-vehicle bars 70A in accordance with the inter-vehicle distance in the ACC symbol 70, the inter-vehicle distance set in the ACC function can be easily comprehended. Moreover, when a preceding vehicle is detected in a state in which the ACC function is operating, the display control device 10 displays the vehicle mark 70C indicating the preceding vehicle. This enables the occupant to appropriately understand that he or she is traveling while the established vehicle-to-vehicle distance with respect to the preceding vehicle is being maintained.

Moreover, by operating the LTA function, the display control device 10 displays the LTA symbol 72 disposed such that a pair of white line markings indicates a lane. This enables the occupant to effectively recognize that the LTA function is operating. Moreover, in cases in which the lane in which the vehicle 12 is traveling cannot be detected, the display control device 10 does not display the white line markings. This enables the occupant to easily recognize that the LTA function is not functioning properly. In the display control device 10, by not displaying the white line markings 72A, the LTA symbol 72 is substantially not displayed. In this case, the operation of the LTA function may be stopped, thereby enabling prevention of an operation of the LTA function that is not anticipated by the occupant owing to the sudden detection of a lane.

Moreover, the display control device 10 superimposes the ACC symbol 70 and the LTA symbol 72 together so as to form a single symbol. This enables plural items of information to be included in a single symbol, enabling the limited display region 16A to be effectively used.

In the present exemplary embodiment, explanation has been given using the HUD 20 that projects (displays) the display images 60, 68 onto the windshield glass 16. However, the display medium for projection of the first display image and the second display image is not limited to the windshield glass, and various known display media can be applied. Moreover, the present exemplary embodiment is not limited to a display device that displays a projected image on a windshield glass, and a transmissive display medium that transmits light in accordance with a display image, such as a liquid crystal display, or a light-emitting display medium that displays an image by emitting light in accordance with a display image, may be applied. Specific examples include a meter display or the like disposed at an instrument panel.

Moreover, in the present exemplary embodiment described above, an example of the vehicle 12 including an engine (reciprocating engine) as a drive source for travel has been described. However, the vehicle may be any of a hybrid electric vehicle (HEV) including an electric motor as the drive source for travel, a plug-in hybrid electric vehicle (PHEV), a fuel cell electric vehicle (FCEV), a battery electric vehicle (BEV), or the like.

A vehicle display device may perform display that is set in accordance with the vehicle in which it is installed. In a vehicle including an electric motor as a drive source, as drive information indicating an operation state of the electric motor, the number of revolutions (rpm), output value (W: watt), or the like of an output shaft (rotation axis) of the electric motor may be applied, and at least one of the number of revolutions or the output value of the output shaft of the electric motor may be displayed. Moreover, in a hybrid vehicle or the like including an engine and an electric motor as a drive source, drive information for the drive source that is currently driving may be displayed, or drive information for each of the two drive sources may be displayed side by side.

Moreover, in the present exemplary embodiment, the control program 32 that is the vehicle display control program is stored (installed) in advance in the storage section 30C. However, the vehicle display control program may be provided in a format recorded on a recording medium such as a compact disc read only memory (CD-ROM), a digital versatile disc read only memory (DVD-ROM), or a universal serial bus (USB) memory. Alternatively, the vehicle display control program may be provided in a format that is downloadable from an external device over a network.

What is claimed is:

1. A vehicle display control device installed at a host vehicle configured to travel as a result of a drive source being driven, the vehicle display control device comprising:
   a memory;
   a processor coupled to the memory; and
   a display device, wherein the processor is configured to:
   control the display device and project an image onto a display region configured at a windshield glass,
   in a case in which a predetermined travel assistance function provided at the host vehicle is not in operation, control the display device such that a first display image is projected onto the display region, the first display image including drive information indicating a drive state of the drive source and information corresponding to a travel state of the host vehicle, and
   in a case in which the predetermined travel assistance function is in operation, control the display device such that a second display image is projected onto the display region, the second display image omitting display of the drive information and including a symbol indicating the predetermined travel assistance function and the information corresponding to a travel state of the host vehicle, wherein the information corresponding to a travel state of the host vehicle includes at least one of: (i) a shift range of the host vehicle, (ii) a vehicle speed, (iii) number of revolutions of the drive source, or (iv) an output value of an output shaft of the drive source.

2. The vehicle display control device according to claim 1, wherein the first display image and the second display image include at least one of information indicating a shift range of the host vehicle or information indicating a vehicle speed.

3. The vehicle display control device according to claim 1, wherein the predetermined travel assistance function includes a function that maintains a vehicle speed and an inter-vehicle distance relative to a preceding vehicle, and the symbol of the second display image includes a symbol indicating the inter-vehicle distance between the host vehicle and the preceding vehicle.

4. The vehicle display control device according to claim 1, wherein the predetermined travel assistance function includes a function that keeps the host vehicle in a travel lane, and the symbol of the second display image includes a symbol indicating the travel lane in which the host vehicle is traveling.

5. The vehicle display control device according to a claim 1, wherein the display region is configured at a lower-side portion of the windshield glass, and the first display image is projected onto a lower-side portion inside the display region.

6. The vehicle display control device according to claim 2, wherein the predetermined travel assistance function includes a function that maintains a vehicle speed and an inter-vehicle distance relative to a preceding vehicle, and the symbol of the second display image includes a symbol indicating the inter-vehicle distance between the host vehicle and the preceding vehicle.

7. The vehicle display control device according to claim 2, wherein the predetermined travel assistance function includes a function that keeps the host vehicle in a travel lane, and the symbol of the second display image includes a symbol indicating the travel lane in which the host vehicle is traveling.

8. The vehicle display control device according to claim 2, wherein the display region is configured at a lower-side portion of the windshield glass, and the first display image is projected onto a lower-side portion inside the display region.

9. The vehicle display control device according to claim 3, wherein the predetermined travel assistance function includes a function that keeps the host vehicle in a travel lane, and the symbol of the second display image includes a symbol indicating the travel lane in which the host vehicle is traveling.

10. The vehicle display control device according to claim 3, wherein the display region is configured at a lower-side portion of the windshield glass, and the first display image is projected onto a lower-side portion inside the display region.

11. The vehicle display control device according to claim 4, wherein the display region is configured at a lower-side portion of the windshield glass, and the first display image is projected onto a lower-side portion inside the display region.

12. A method of vehicle display control for projecting an image by a display device onto a display region configured at a windshield glass of a vehicle that is configured to travel as a result of a drive source being driven, the vehicle being provided with a memory, a processor coupled to the memory, and the display device, the method comprising:

in a case in which a predetermined travel assistance function provided at the vehicle is not in operation, the processor controlling the display device such that a first display image is projected onto the display region, the first display image including drive information indicating a drive state of the drive source and information corresponding to a travel state of the vehicle; and in a case in which the predetermined travel assistance function is in operation, the processor controlling the display device such that a second display image is projected onto the display region, the second display image omitting display of the drive information and including a symbol indicating the predetermined travel assistance function and the information corresponding to a travel state of a host vehicle, wherein the information corresponding to a travel state of the host vehicle includes at least one of: (i) a shift range of the host vehicle, (ii) a vehicle speed, (iii) number of revolutions of the drive source, or (iv) an output value of an output shaft of the drive source.

13. A non-transitory storage medium storing a vehicle display control program executable by a computer to perform processing, the computer being provided at a vehicle configured to travel as a result of a drive source being driven, and being configured to project an image onto a display region configured at a windshield glass of the vehicle, the processing comprising:

in a case in which a predetermined travel assistance function provided at the vehicle is not in operation, projecting a first display image onto the display region, the first display image including drive information indicating a drive state of the drive source and information corresponding to a travel state of the vehicle; and in a case in which the predetermined travel assistance function is in operation, projecting a second display image onto the display region, the second display image omitting display of the drive information and including a symbol indicating the predetermined travel assistance function and the information corresponding to a travel state of a host vehicle, wherein the information corresponding to a travel state of the host vehicle includes at least one of: (i) a shift range of the host vehicle, (ii) a vehicle speed, (iii) number of revolutions of the drive source, or (iv) an output value of an output shaft of the drive source.

\* \* \* \* \*